Figure 1:
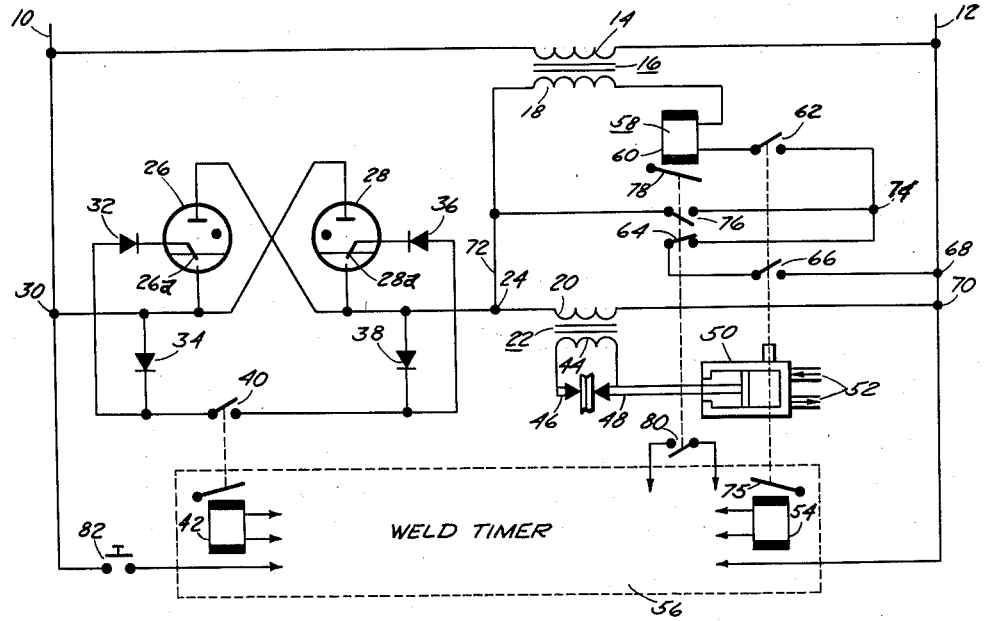

Jan. 3, 1961 R. C. MIERENDORF ET AL 2,967,227
CONTROL CIRCUIT
Filed July 8, 1958

INVENTOR.
ROBERT C. MIERENDORF
CLARENCE W. PORTER
BY

United States Patent Office 2,967,227
Patented Jan. 3, 1961

2,967,227

CONTROL CIRCUIT

Robert C. Mierendorf and Clarence W. Porter, Wauwatosa, Wis., assignors to Square D Company, Detroit, Mich., a corporation of Michigan Filed July 8, 1958, Ser. No. 747,179

5 Claims. (Cl. 219—108)

This invention relates to control circuits and is more particularly concerned with a circuit which utilizes the closure of the welder electrodes to provide a control signal.

The cricuits according to the present invention utilize the discovery that the impedance of the welding transformer varies when the welder electrodes are moved from the open to closed position. Heretofore various schemes have employed this principle to control welders in an effort to provide a system which would compensate for electrode wear and eliminate the effect of power transients on the timing cycles of the welder. An example of a control system which incorporates the above principle is to be found in the Smith patent, 2,112,716, issued March 29, 1938, which has been assigned to the assignee of the present invention. While the system disclosed in this patent has performed satisfactorily, it has been found that because of the variations in air line pressure and conditions of the surface of the materials to be welded, an irregular condition of the welder gun will occur when a series of repeated welds are to be made. The present invention overcomes the difficulties found in the Smith system and will eliminate the need for squeeze delay time and, if desired, the normal squeeze time circuits as used in the present day conventional welders. Further, the present system will prevent the firing of a weld before the electrodes are closed on the work. This will prevent burning of the electrodes and the work piece and will provide an increased electrode life and compensate for electrode wear as well as eliminate the harmful effects on the firing circuit components caused by ignitrons failing to fire because of open welder transformer secondary circuit.

The apparatus according to the present invention may be utilized with a standard sequence weld timer, such as disclosed in application Serial No. 723,182, which was filed March 24, 1958, and which is assigned to the assignee of the present invention. It has been found that the squeeze delay in this weld timer may be eliminated and when the normal squeeze time is adjusted to endure a slightly longer period than the regular electrode closure time, the welding operation will occur in a uniform sequence without irregularity, in spite of variations in the air line pressure, the condition of the work surface and the material thickness and electrode wear. The above desirable features are realized by utilizing two independent signals which are combined and correlated in the apparatus according to the present invention before a signal is applied to the weld timer which controls the weld sequence. In this connection it is to be noted that the conventional weld timers usually operate to provide the following cycles: "Squeeze Time," "Weld Time," "Hold Time," and "Off Time." These terms and their functions are well known to those skilled in the welding art.

It is an object therefore of the present invention to correlate a signal related to the electrode closure of the welder with another signal to control the operation of the welder.

A further object of the present invention is to utilize a signal which is responsive to the closure of the electrodes of a welder to initiate the timing of the weld current and correlate the signal with a second signal so the repeated weld sequence will be uniform in spite of variations in air line pressure, electrode wear and the materials on which the welding operations are to be performed.

Another object of the present invention is to utilize a signal which initiates the closure of the electrodes and a signal which indicates the closure of the electrodes of a welder to control the operation of the welder.

Further objects and features of the invention will be readily apparent to those skilled in the art from the specification and appended drawing illustrating certain preferred embodiments in which:

Fig. 1 diagrammatically shows one form of a control circuit according to the present invention.

Figure 2:
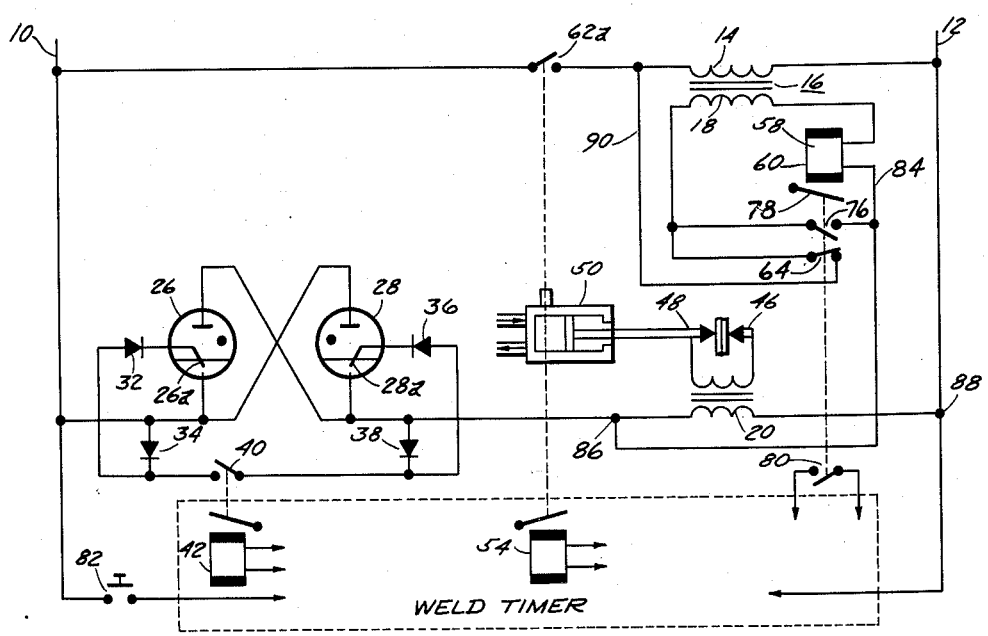

Fig. 2 illustrates a modified form of the control circuit in Fig. 1.

In the drawings, and in Fig. 1 particularly, the numerals 10 and 12 indicate a pair of leads which are connected to a suitable source of alternating current. Connected across leads 10 and 12 is a primary winding 14 of a transformer 16 which has a secondary winding 18. Also connected in series circuit across leads 10 and 12 is a primary winding 20 of a welding transformer 22 which is connected through a junction 24 through a pair of uni-directional conducting devices shown as ignitrons 26 and 28 which are connected in inverse parallel in the conventional manner to lead 10 at junction 30. As well known, each of the ignitrons 26 and 28 have ignitors 26a and 28a respectively, which are connected in a firing circuit comprising the rectifiers 32, 34, 36, and 38, which are connected in a conventional manner so the closure of the switch contacts 40 of the weld relay 42 will cause the ignitrons 26 and 28 to become alternately conductive to pass full wave alternating current to the primary winding 20. The transformer 22 has a secondary winding 44 connected in circuit with a pair of welding electrodes 46 and 48. The welding electrode 48 is movable to an open and closed position with electrode 46 by a valve means 50 which is actuated by fluid pressure delivered by lines 52. The valve means 50 is controlled by the valve relay 54. As here shown, the weld relay 42 and the valve relay 54 are included in a weld timer. The weld timer may be any of the well known types such as described in the application mentioned supra.

The secondary winding 18 is connected in a series circuit with the actuating coil 58 of a relay 60, a normally open switch 62, a normally closed switch 64 and a normally open switch 66 to junction 68. The junction 68 in turn is connected through lead 12 and a junction 70 to the primary winding 20 which in turn is connected through a junction 24 and a lead 72 to the transformer 18. Connected between the switches 62 and 64 at a junction 74 is a switch 76. The switch 76 has normally open contacts which, when closed, will complete a circuit between junction 74 and lead 72. The relay 58 has an armature 78 mechanically connected as shown to switches 76, 64, and a switch 80 which has normally open contacts in a circuit to actuate the weld timer 56. The valve relay 54 has an armature 75 suitably mechanically connected to actuate the valve means 50, the switch 66 and the switch 62. With the above parts in mind, the operation of the system according to the present invention will now be described.

When the initiating switch 82 to the weld timer 56 is closed, after a predetermined time the valve relay 54 will be energized to move its armature 75 to actuate the valve means 50 which initiates the movement of the electrode 48 toward electrode 46 to engage the work piece which is positioned therebetween. Simultaneously, with the energization of the valve means 50, the relay 54 will cause the switches 66 and 62 to be closed to complete a series circuit which includes the secondary 18, the actuating coil 60 and the primary winding 20. When this circuit is initially energized and the electrodes 46 and 48 are in the open or separated position, the impedance of the primary winding 20 will be relatively high and a small voltage drop will be present across the relay winding 60. This voltage drop will be insufficient to cause movement of armature 78. When the electrodes 46 and 48 are moved to the closed position in engagement with a work piece, the impedance of the primary winding 20 will be decreased an appreciable amount and the increased voltage drop across the winding 60 will be sufficient to energize the relay 58 and attract and move the armature 78 to close switches 76 and 80 and open the switch 64. The closure of switch 76 will establish a holding circuit for the relay which includes the primary winding 18, the relay coil 60 and the junction 74. The opening of switch 64 will break the circuit between the winding 18 and the primary winding 20 of the welding transformer. The closure of switch 80 will complete an initiating circuit in the weld timer which will in due course actuate the weld relay 42 causing the closure of the switch 40 to render the ignitrons 26 and 28 conductive, thereby causing the flow of welding current through the transformer winding 20. After a predetermined interval the weld timer will de-energize the relays 42 and 54. When relay 42 is de-energized, the firing of circuit to the ignitrons 26 and 28 is broken, thereby interrupting the flow of welding current. The de-energization of relay 54 will actuate the valve means 50 to cause the separation of the welding electrodes 46 and 48. Simultaneously, the relay 54 when de-energized will cause switches 62 and 66 to open. When switch 62 is opened, the holding circuit between the secondary winding 18 and the actuating coil 60 is interrupted to deenergize relay 58 and thereby cause the opening of switch 80 to the weld timer so as to restore the circuits to their standby condition. If the weld timer is set to the non-repeat condition, the switch 82 will have to be opened and closed before the above sequence can be repeated. However, if the welder is set to the repeat position and the squeeze time interval, as determined by the setting of the weld timer, is adjusted to have a period slightly longer than the period required for the closure of electrodes 46 and 48 by valve means 50, then the repeat operation of the welder will occur in a uniform sequence and each weld will be made with the electrodes in firm contact with the material to be welded before the flow of weld current is initiated.

In the embodiment shown in Fig. 2, like numerals correspond to like parts which will provide similar functions as described in the embodiment shown in Fig. 1 of the drawings.

In this embodiment the primary winding 14 of the transformer 16 is connected through a normally open switch 62a to leads 10 and 12. The secondary winding 18 of transformer 16 is connected in series circuit through the actuating coil 60 of the relay 58 and through a lead 84 to a junction 86. The junction 86 in turn is connected through the primary winding 20 of the weld transformer to a junction 88 which is connected through lead 12 and the winding 14 to lead 90 which is connected through normally closed contacts of switch 64 to the other terminal of the transformer winding 18. The circuit from transformer winding 18 through the actuating coil winding may also be completed through the normally open switch 76 which when closed will complete a holding circuit including the winding 18, the coil winding 60 and the switch 76. The switches 76, 64 and 80 are mechanically connected to be actuated when relay 58 is sufficiently energized. The switch 62a and the valve means 50 are mechanically connected to be actuated when the valve relay 54 is energized. The switch 40 is arranged to be closed when the weld relay 42 is energized. The operation of the system is essentially similar to that described for Fig. 1, that is, the closure of switch 82 will cause the valve relay 54 to be energized to move the electrodes 48 and 46 into engagement with a work piece to be welded. When the relay 54 is actuated, the switch 62a will close to complete a circuit to the primary winding 14 of transformer 16. This will cause the secondary winding 18 to be energized and cause a flow of current through the relay 58 and the primary winding 20 of the weld transformer. During the period when the electrodes are in the open position the high impedance of the primary winding 20 will prevent the relay 58 from being sufficiently energized to cause movement of its armature 78 to cause actuation of the switches 76, 64 and 80. However, when the welding electrodes have been moved to the closed position, the impedance of winding 20 will decrease sufficiently to permit the relay 58 to be energized to actuate switches 76, 64 and 80. When switches 76 and 64 are energized, a holding circuit for coil winding 60 is closed and the actuating circuit through switch 64 is opened. The switch 80 will complete the initiating circuit to the weld timer. After the weld sequence has been completed, as determined by the weld timer, the relay 54 will be de-energized, to cause the electrodes 46 and 48 to separate and switch 62a to open, thereby de-energizing the transformer 16 and relay 58 to cause the switches 76, 64 and 80 to be returned to the open position as shown.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a control system, the combination comprising a weld sequence timer; a transformer having a primary and secondary winding, a pair of movable electrodes connected in circuit with the secondary winding, means controlled by the timer and energizable for moving the electrodes into engagement with a work piece, a second transformer having a secondary winding connected in circuit with the primary winding of the first transformer, a relay having an actuating coil and a pair of normally closed contacts in the circuit connecting the secondary winding and primary winding, whereby the energization of the relay is dependent on the energization of windings in circuit therewith, means responsive to the energization of the means for moving the electrodes for controlling the energization of the secondary winding of the second transformer and means responsive to the energization of the relay for controlling the weld timer.

2. In a control circuit for a spot welder, the combination comprising; a welding transformer having a primary and secondary winding, a pair of welding electrodes in circuit with the secondary winding, said electrodes being movable from an open position to a closed position in engagement with a work piece and causing the impedance of the primary winding to be decreased to a minimum when the electrodes are in the closed position, means actuable for causing the electrodes to be moved from the open to the closed position, and means including a transformer having a primary winding energized when said means is actuated and a secondary winding and a relay having an actuating coil in circuit with the welding transformer primary, and means for completing a circuit to the second mentioned transformer primary when the electrode moving means is actuated, whereby the energization of the relay is dependent on the actuation of the electrode moving means and the impedance of the primary winding of the welding transformer.

3. The combination as set forth in claim 2 wherein the relay has a pair of contacts which are closed when the relay actuating coil is energized to close a circuit which initiates the operating of a welding timer.

4. The combination as set forth in claim 3 wherein the weld timer has a squeeze time adjustment which is timed slightly longer than the time period required for the electrodes to move from the open to the closed position to assure a steady and uniform welding operation.

5. The combination as recited in claim 2 wherein the relay has contacts which are closed when the relay is fully energized to complete a holding circuit for the relay which excludes the primary winding of the welding transformer.

References Cited in the file of this patent

UNITED STATES PATENTS

| | | |
|---|---|---|
| 2,112,716 | Smith | Mar. 29, 1938 |
| 2,295,601 | Overbeck | Sept. 15, 1942 |
| 2,443,777 | Ringer | June 22, 1948 |
| 2,459,041 | Mitsch | Jan. 11, 1949 |
| 2,472,041 | Davies | May 31, 1949 |
| 2,763,769 | Childs | Sept. 18, 1956 |